Figure 1:
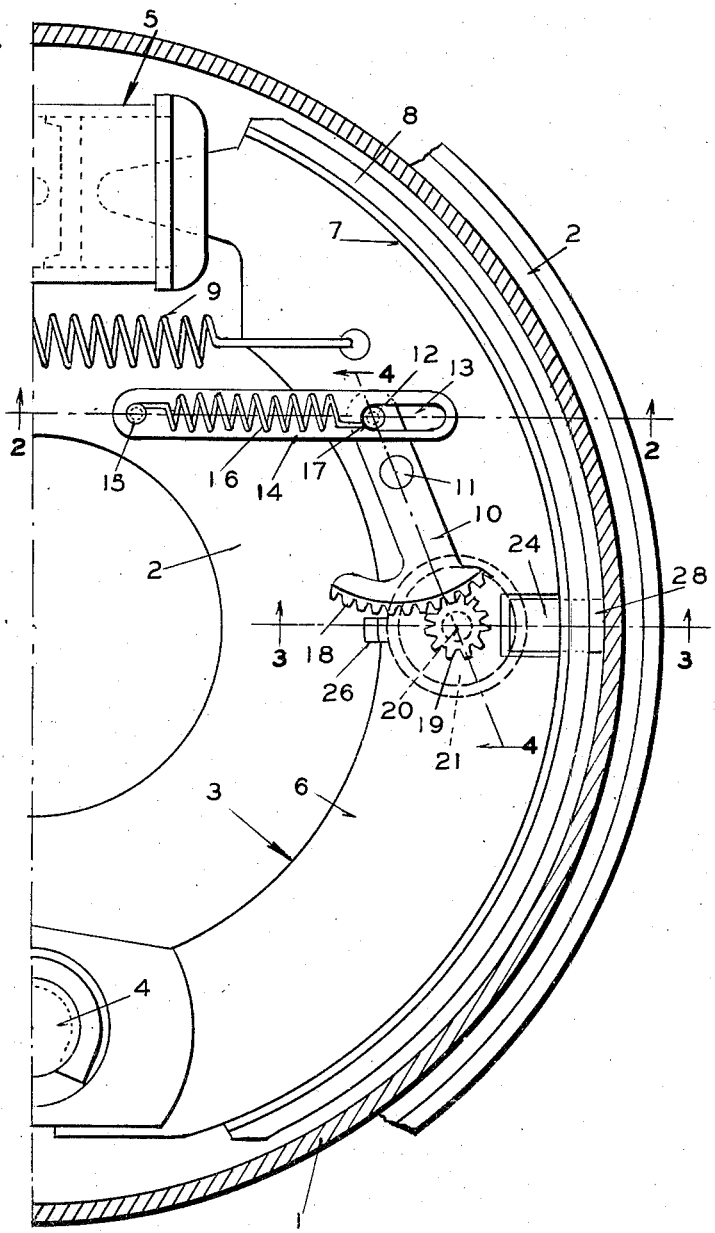

Dec. 26, 1944.  S. SCHNELL  2,366,058

AUTOMATIC BRAKE SHOE ADJUSTING MECHANISM

Filed Sept. 10, 1943   2 Sheets-Sheet 1

INVENTOR
S. SCHNELL

BY

ATTORNEY

Dec. 26, 1944. S. SCHNELL 2,366,058
AUTOMATIC BRAKE SHOE ADJUSTING MECHANISM
Filed Sept. 10, 1943 2 Sheets-Sheet 2
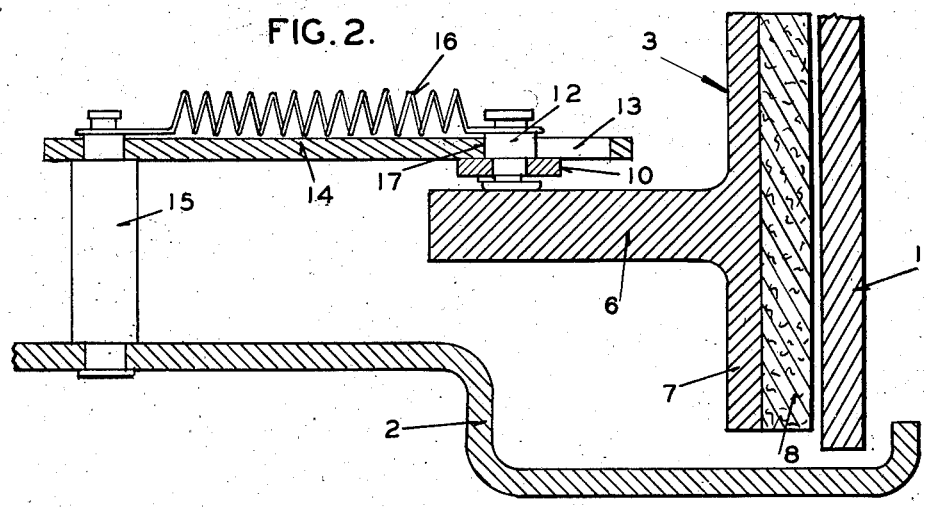
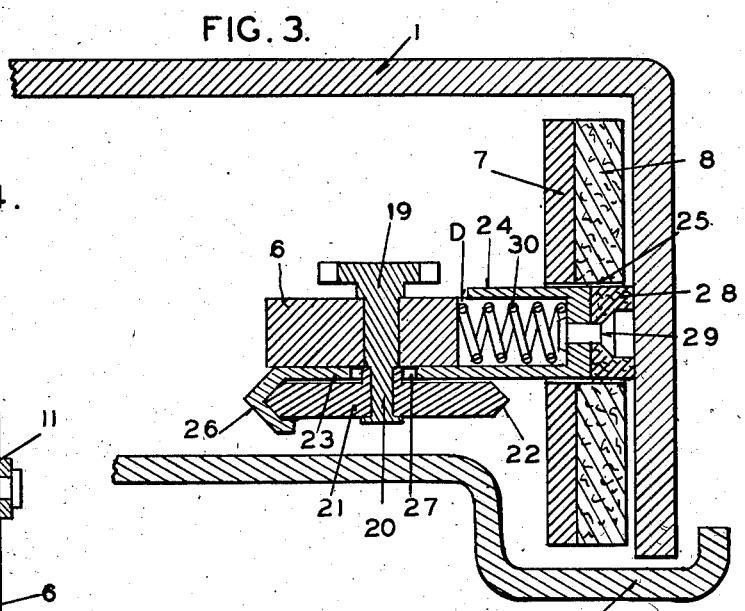
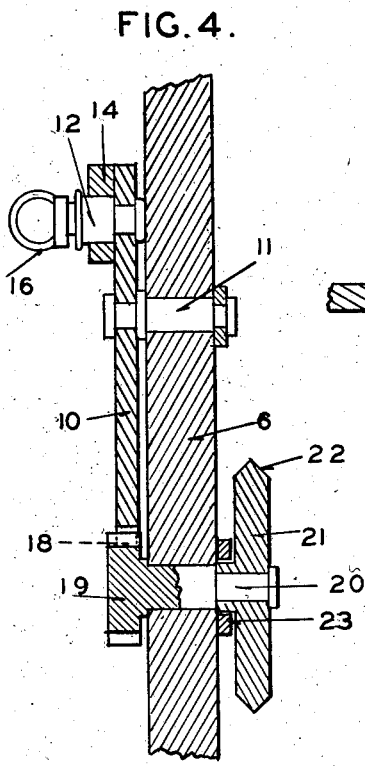
INVENTOR
S. SCHNELL
BY
ATTORNEY Patented Dec. 26, 1944

2,366,058

UNITED STATES PATENT OFFICE 2,366,058

AUTOMATIC BRAKE SHOE ADJUSTING MECHANISM

Steve Schnell, Kirkwood, Mo., assignor to Wagner Electric Corporation, St. Louis, Mo., a corporation of Delaware Application September 10, 1943, Serial No. 501,771

16 Claims. (Cl. 188—79.5)

My invention relates to brakes and more particularly to adjusting mechanism for the friction element thereof.

One of the objects of my invention is to provide improved brake shoe adjusting mechanism which will be automaticaly operable to maintain the "off" position of the shoe substantially constant regardless of lining wear or expansion and contraction of the drum due to temperature changes.

Another object of my invention is to provide an improved brake shoe adjusting mechanism of the kind referred to which will employ the drum surface as a point of reference and will have all of its movable parts carried by the brake shoe.

Other objects of my invention will become apparent from the following description taken in connection with the accompanying drawings in which Figure 1 is a view of part of a brake assembly having an adjusting mechanism embodying my invention; and Figures 2, 3, and 4 are sectional views showing details of construction, said views being taken on the lines 2—2, 3—3, and 4—4, respectively, of Figure 1.

Referring to the drawings in detail, numeral 1 indicates a brake drum secured to rotate with the wheel of the vehicle and 2 a fixed backing plate or support for closing the open side of the drum. A brake shoe 3 is provided for cooperation with the drum, said shoe having its lower or heel end pivotally mounted on the backing plate by means of an anchor pin 4 and being actuated at its toe end by a fluid motor 5 secured to the backing plate. The fluid motor is actuated by fluid under pressure from a remote source as is well-known practice. The brake shoe comprises a web 6 and a lining carrying flange 7 to which is secured the friction lining 8 for cooperation with the drum surface. The brake shoe is retracted from the drum by a retracting spring 9 which is connected between the brake shoe 3 and the companion brake shoe (not shown) of the brake assembly.

The brake shoe adjusting mechanism embodying my invention has a lever 10 pivotally mounted intermediate its ends by a pin 11 on web 6 of the brake shoe 3. The upper end of this lever carries a pin 12 which extends into a slot 13 in one end of a link 14, the other end of said link being pivoted to a pin 15 carried by the backing plate 2. A spring 16 normally biases pin 12 to engage the inner end surface 17 of slot 13.

The lower end of lever 10 is provided with gear teeth 18 for cooperation with a gear 19 having an integral shaft 20 for rotatably mounting said gear in web 6 of shoe 3. As best shown in Figure 3, the end of shaft 20 on the side of the web opposite gear 19 has secured thereto a disc 21 for simultaneous rotation with the gear, said disc being provided with a V-shaped peripheral surface 22. The disc is arranged to be slightly spaced from the surface of the web in order to provide space for the reception of a flat extension 23 carried by a drum contacting member 24 which is supported on the shoe by being mounted in a recess 25 formed in the lining, the lining carrying flange, and the web of the shoe. The extension 23 has its outer end 26 turned over and formed to provide a V-shaped groove for cooperation with the V-shaped surface on the disc. The extension 23 has a slot 27 through which shaft 20 extends.

The outer end of the drum contacting member carries friction material 28 similar to that of lining 8 for the brake shoe, said material being secured to the member by a rivet 29. The contacting member is of hollow construction and positioned therein is a coil spring 30 which acts between the web of the shoe and the contacting member to normally bias the contacting member outwardly and to a position where the V-shaped groove in the end of extension 23 is held in engagement with the disc to thus brake the gear 19. The arrangement is such that when the end of the extension engages the disc, the inner end of the contacting member will be spaced from the web a distance indicated at D in Figure 3 and corresponding to the clearance desired at all times to be present between the lining 8 of the shoe and the brake drum when the shoe is retracted. Under these conditions the outer end of the friction material on the end of the drum contacting member will project beyond the surface of the lining the same distance as the distance D. The proper projection distance can be readily obtained by pushing the contacting member inwardly until the inner end thereof abuts the shoe web and then grinding the friction material 28 on the end of the contacting member so that it is flush with the lining.

Referring to the operation of my adjusting mechanism, the parts thereof will assume the positions shown in the various figures when the brake shoe is retracted from the drum. Under these conditions pin 12 on the upper end of lever 10 will be held against the end surface 17 of the slot in link 14 and since this link is carried by the backing plate, it will act as an abutment for the "off" position of the brake shoe. The lever 10 will not have any relative movement with respect to the brake shoe because when the brake shoe is disengaged from the drum, the drum contacting member 24 will be pushed outwardly by spring 30 and will hold the V-shaped end of extension 23 in pressure engagement with the surface of the disc, thus braking gear 19 and preventing turning thereof. Since the gear is in mesh with the teeth on the end of the lever, the lever also will be braked and held from rotation. The braking force need not be great because of the smallness of the gear and the leverages employed.

If the brake shoe should now be applied, the lever and its pivot pin 11 will be carried with the brake shoe as it is moved toward the drum. Since spring 16 holds the upper end of the lever fixed with respect to the backing plate, the lever will be caused to pivot on its pivot pin 11. This will cause a rotation of gear 19 and disc 22. This rotation of gear 19 is permitted because as soon as the brake shoe is moved toward the drum, the brake for the gear will be released as a result of the relative movement between the shoe and the drum contacting member which is continuously in contact with the drum surface. When the lining of the brake shoe engages the drum, the end of the drum contacting member will be flush with the shoe lining surface and the inner end of the drum contacting member will abut web 6 of the shoe. Thus whenever any wear of the brake lining takes place, the friction material on the end of the drum contacting member will wear an equal amount because both the lining and the material 28 will be held in engagement with the drum by the same pressure.

When the brake shoe is retracted, the drum contacting member will continue to be maintained in engagement with the drum surface and the shoe will be moved relatively thereto and away from the drum by the action of the shoe retracting spring 9. The retracting movement of the shoe will result in lever 10 again being rotated about its pivot pin 11 but in the reverse direction to the rotation resulting from the shoe being engaged with the drum. This reverse rotation of the lever will also cause a reverse rotation of gear 19 and the disc 22. When the brake shoe has been retracted a predetermined distance, the end 26 on the extension of the drum contacting member will engage the disc and stop rotation of gear 19 and also lever 10. Since lever 10 cannot move relatively to the brake shoe, the link 14 will again act as an abutment for the shoe and prevent any further retraction of the shoe from the drum.

Regardless of lining wear, the shoe will always return to a retracted position where the shoe lining will have a predetermined clearance with respect to the drum due to the disc being re-braked when the predetermined distance D is attained between the drum contacting member and the shoe web. As wear of lining 8 takes place, the brake shoe will move slightly outwardly relatively to the brake drum. This, of course, will result in a greater angle of rotation of gear 19. When the brake shoe is released, however, after lining wear, gear 19, during its reverse rotation, will be braked slightly before it has rotated reversely through the angle of forward rotation. Consequently, the brake shoe, that is, the web and lining carrying flange, will not be retracted from the drum as far as it was prior to the wear of the lining. The brake shoe has thus been "notched up" to compensate for the lining wear.

If there should be expansion of the brake drum due to increased heat caused by brake application, the brake shoe and drum contacting member will both follow out with the drum. Consequently, this additional movement of the brake shoe will result in a greater angle of turning of lever 10 and gear 19 than would be the case where there is no drum expansion. When the brake shoe is released, the brake shoe will only be permitted to return from the brake drum the distance to provide the predetermined clearance between the lining and the drum since at such distance the disc will become braked to prevent relative movement between lever 10 and the brake shoe. When the brake drum contracts upon cooling, it will move inwardly relatively to the brake shoe and also push the drum contacting member 24 inwardly relatively to the shoe. This will release the brake for the gear 19 and permit some relative rotative movement of lever 10 on the brake shoe under the action of the retracting spring. The retracting spring will thus move the brake shoe slightly inwardly until it reaches a position where gear 19 is again braked. It is thus seen that regardless of drum expansion or contraction the adjusting mechanism will continue to make automatic adjustments to maintain the "off" position clearance between the lining and the drum substantially constant.

It is to be noted from the above described construction and its operation that there is no necessity for any manual adjustment of the brake shoe throughout the life of the lining of the brake shoe in order to maintain proper predetermined "off" position clearance at all times. The relationship of the parts is determined prior to manufacture with the exception of the thickness of the friction material on the end of the contacting member. When the mechanism is mounted on the shoe, this thickness will be properly made by merely pushing the contacting member inwardly as far as possible and then grinding the material 28 to be flush with the surface of the brake shoe lining.

The purpose of slot 13 in link 14 is to insure that the brake on gear 19 will be released under all conditions. When the brake shoe is originally assembled, the drum contacting member may not be in contact with the drum. Under these conditions the brake would not be released as the shoe is moved toward the drum if lever 10 were prevented from rotation by being pivoted in link 14 instead of having a slot connection therewith. This failure to release may result in harmful strain on the parts. With slot 13 the upper end of the lever is permitted to move relatively to the link until the drum contacting member engages the drum and releases the brake. The adjusting mechanism will then function in the manner already described and there will be no further movement of pin 12 in slot 13, pin 12 being returned by spring 16 to its abutting engagement with the end surface 17 of the slot. Also, a condition might prevail during brake operation wherein the expansion of the drum will take place after the brake shoe has been retracted from a brake application. Under such conditions the drum might move away from the drum contacting member and consequently the disc would not be freed during initial movement of the shoe when it is again actuated. With slot 13 present, no harm will be done by a delayed release of the disc.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In adjusting mechanism, a support, two friction elements movable relatively to each other to friction-engaged positions and disengaged positions, stop means carried by the support, a movable member carried by one of the friction elements for cooperation with said stop means, means causing said movable member to be moved whenever relative movement occurs between the friction elements, and means including a wheel and brake element for so controlling the movement of said movable member that it will be prevented from movement relatively to said one friction element when the friction elements assume predetermined disengaged positions.

2. In adjusting mechanism, a support, two friction elements movable relatively to each other to friction-engaged positions and disengaged positions, stop means carried by the support, a movable member carried by one of the friction elements for cooperation with said stop means, means causing said movable member to be moved whenever relative movement occurs between the friction elements, and means comprising an element carried by said one of the friction elements and constantly contacting the other friction element for so controlling the movement of said movable member that it will be prevented from movement relatively to said one friction element when the friction elements assume predetermined disengaged positions.

3. In adjusting mechanism, a support, two friction elements movable relatively to each other to friction-engaged positions and disengaged positions, stop means carried by the support, a rotatable member carried by one of the friction elements and having a part for cooperation with said stop means, means causing said rotatable member to be rotated whenever relative movement occurs between the friction elements, and means including a wheel and brake element for stopping the rotation of said member when the friction elements assume predetermined disengaged positions.

4. In adjusting mechanism, a support, two friction elements movable relatively to each other to friction-engaged positions and disengaged positions, stop means carried by the support, a rotatable member carried by one of the friction elements and having a part for cooperation with said stop means, means causing said rotatable member to be rotated whenever relative movement occurs between the friction elements, and means for stopping the rotation of said member when the friction elements assume predetermined disengaged positions, said stopping means comprising a member carried by said one of the friction elements and constantly contacting the other friction element and spring means acting on said last named member to cause operation of the stopping means as the friction elements are moved relatively away from each other.

5. In adjusting mechanism for a brake, a support, a drum, a brake shoe for engagement with and disengagement from the drum, a rotatable member mounted on the brake shoe, stop means carried by the support and engaged by a part of the rotatable member, said member and stop means being so associated that the member will be rotated whenever the shoe is moved to be engaged and disengaged from the drum, and means for holding the rotatable member from rotation and thereby permit the stop means to act as an abutment for the shoe when the shoe is retracted from the drum to a position where its friction surface has a predetermined clearance with the drum, said last named means comprising a member carried by the shoe and constantly contacting the drum.

6. In adjusting mechanism for a brake, a support, a drum, a brake shoe for engagement with and disengagement from the drum, a rotatable member mounted on the brake shoe, stop means carried by the support and engaged by a part of the rotatable member, said member and stop means being so associated that the member will be rotated whenever the shoe is moved to be engaged and disengaged from the drum, and means including a wheel and brake for holding the rotatable member from rotation and thereby permit the stop means to act as an abutment for the shoe when the shoe is retracted from the drum to a position where its friction surface has a predetermined clearance with the drum.

7. In adjusting mechanism for a brake, a support, a drum, a brake shoe for engagement with and disengagement from the drum, a rotatable member mounted on the brake shoe, stop means carried by the support and engaged by a part of the rotatable member, a spring for yieldably holding said part of the rotatable member in engagement with the stop means so that when the shoe is moved the rotatable member will be rotated, and means including a wheel and brake for holding the rotatable member from rotation and thereby permit the stop means to act as an abutment for the shoe when the shoe is retracted from the drum to a position where its friction surface has a predetermined clearance with the drum.

8. In adjusting mechanism for a brake, a support, a drum, a brake shoe for engagement with and disengagement from the drum, a rotatable member mounted on the brake shoe, stop means carried by the support and engaged by a part of the rotatable member, said member and stop means being so associated that the member will be rotated whenever the shoe is moved to be engaged and disengaged from the drum, means comprising a second rotatable member carried by the shoe and connected to be rotatable with the first rotatable member, means engageable with the second rotatable member against rotation, and means for so controlling the engaging means that it will assume a holding position when the shoe is in a disengaged position where there is a predetermined clearance between the shoe friction surface and the drum.

9. In adjusting mechanism for a brake, a support, a drum, a brake shoe for engagement with and disengagement from the drum, a lever pivoted on the brake shoe, stop means carried by the support and engaged by the lever on one side of its pivot, said lever and stop means being so associated that the lever will be movable about its pivot whenever the shoe is moved to be engaged and disengaged from the drum, and means including a rotatable element and a brake for preventing pivotal movement of the lever on the shoe when the shoe is retracted from the drum to a position where its friction surface has a predetermined clearance with the drum.

10. In adjusting mechanism for a brake, a support, a drum, a brake shoe for engagement with and disengagement from the drum, a lever pivoted on the brake shoe, stop means carried by the support and engaged by the lever on one side of its pivot, said lever and stop means being so associated that the lever will be movable about its pivot whenever the shoe is moved to be engaged and disengaged from the drum, and means for preventing pivotal movement of the lever on the shoe when the shoe is retracted from the drum to a position where its friction surface has a predetermined clearance with the drum, said last named means comprising a member in continuous contact with the drum.

11. In adjusting mechnaism for a brake, a support, a drum, a brake shoe for engagement with and disengagement from the drum, a lever pivoted on the brake shoe, stop means carried by the support and engaged by the lever on one side of its pivot, said lever and stop means being so associated that the lever will be movable about its pivot whenever the shoe is moved to be engaged and disengaged from the drum, and means for preventing pivotal movement of the lever on the shoe, said last named means comprising a braking means for holding the lever from pivotal movement and spring-controlled means for applying the braking means when the shoe is in a position where its friction surface has a predetermined clearance with the drum.

12. In adjusting mechanism for a brake, a support, a drum, a brake shoe for engagement with and disengagement from the drum, a lever pivoted on the brake shoe, stop means carried by the support and engaged by the lever on one side of its pivot, said lever and stop means being so associated that the lever will be movable about its pivot whenever the shoe is moved to be engaged and disengaged from the drum, and means for preventing pivotal movement of the lever on the shoe, said last named means comprising a braking means for holding the lever from pivotal movement, a spring-controlled member constantly contacting the drum and means permitting the spring-controlled member to apply the braking means when the shoe is moved away from the drum.

13. In adjusting mechanism for a brake, a support, a drum, a brake shoe for engagement with and disengagement from the drum, a lever pivoted on the brake shoe, stop means cooperating with the lever on one side of its pivot, a spring biasing the lever into engagement with the stop means so that the lever will be movable about its pivot whenever the shoe is moved to be engaged and disengaged from the drum, and means for preventing pivotal movement of the lever on the shoe when the shoe is retracted from the drum to a position where its friction surface has a predetermined clearance with the drum, said last named means comprising a member in continuous contact with the drum.

14. In adjusting mechanism for a brake, a support, a drum, a brake shoe for engagement with and disengagement from the drum, a lever pivoted on the brake shoe, a member carried by the support and engaged by the lever on one side of its pivot, said lever and member being so associated that the lever will be movable about its pivot when the shoe is engaged and disengaged from the drum, a member rotatably mounted on the shoe and connected to be rotated by the lever when the latter is moved, and means for preventing rotation of the rotatable member when the shoe is retracted to a position where its friction surface has a predetermined clearance with the drum.

15. In adjusting mechanism for a brake, a support, a drum, a brake shoe for engagement with and disengagement from the drum, a lever pivoted on the brake shoe, a member carried by the support and engaged by the lever on one side of its pivot, said lever and member being so associated that the lever will be movable about its pivot when the shoe is engaged and disengaged from the drum, a member rotatably mounted on the shoe, means for rotating the member simultaneously with the lever, and means carried by the shoe and cooperating with the rotatable member and the drum for preventing rotation of said rotatable member when the shoe is retracted to a position where its friction surface has a predetermined clearance with the drum.

16. In adjusting mechanism for a brake, a support, a drum, a brake shoe for engagement with and disengagement from the drum, a lever pivoted on the brake shoe intermediate its end and provided with gear teeth on one end, a stop member carried by the support and engaged by the other end of the lever, said lever and stop member being so associated that the lever will be moved about its pivot when the shoe is engaged and disengaged from the drum, a gear on the shoe meshing with the teeth on the lever, a disc connected to rotate with the gear, a member contacting the drum, said last named member being mounted on the shoe so that the shoe can move relatively thereto when it is engaged and disengaged from the drum, a spring interposed between the drum contacting member and shoe, and means carried by the drum contacting member for pressure engagement with the disc under the action of the spring to thereby prevent rotation of the gear and lever and when the brake shoe is retracted from the drum to a position where its friction surface has a predetermined clearance with the drum.

STEVE SCHNELL.